(12) United States Patent
Iwata et al.

(10) Patent No.: US 9,228,669 B2
(45) Date of Patent: Jan. 5, 2016

(54) FLUID CONTROL VALVE

(71) Applicant: CKD CORPORATION, Komaki-shi, Aichi (JP)

(72) Inventors: Hiroki Iwata, Kasugai (JP); Hideyuki Takeda, Kasugai (JP)

(73) Assignee: CKD CORPORATION, Komaki (JP)

( * ) Notice: Subject to any disclaimer, the term of this patent is extended or adjusted under 35 U.S.C. 154(b) by 291 days.

(21) Appl. No.: 13/708,244

(22) Filed: Dec. 7, 2012

(65) Prior Publication Data

US 2013/0146151 A1 Jun. 13, 2013

(30) Foreign Application Priority Data

Dec. 12, 2011 (JP) ................................. 2011-271355
Nov. 2, 2012 (JP) ................................. 2012-242891

(51) Int. Cl.
F16K 27/00 (2006.01)
F16K 27/02 (2006.01)

(52) U.S. Cl.
CPC ............. *F16K 27/00* (2013.01); *F16K 27/0236* (2013.01); *Y10T 137/598* (2015.04)

(58) Field of Classification Search
CPC .............................. F16K 27/00; F16K 27/0236
USPC ............................................. 251/335.2, 331
See application file for complete search history.

(56) References Cited

U.S. PATENT DOCUMENTS 6,612,536 B2 * 9/2003 Dalton ............................. 251/25
6,684,901 B1 * 2/2004 Cahill et al. ............. 137/315.03
6,874,756 B2 * 4/2005 Hawkins et al. ............... 251/291
2003/0030021 A1 2/2003 Hawkins et al.
2005/0253100 A1 11/2005 Yasue et al.

FOREIGN PATENT DOCUMENTS

| CN | 1516792 A | 7/2004 |
|---|---|---|
| CN | 1751200 A | 3/2006 |
| JP | A-09-042508 | 2/1997 |
| JP | A-2004-526919 | 9/2004 |
| KR | 20-0326101 | 9/2003 |
| KR | 20-0424084 | 8/2006 |

OTHER PUBLICATIONS

Dec. 13, 2013 Korean Office Action issued in Korean Application No. 10-2012-0144221 (with translation).

* cited by examiner

*Primary Examiner* — Marina Tietjen
*Assistant Examiner* — Daphne M Barry
(74) *Attorney, Agent, or Firm* — Oliff PLC

(57) ABSTRACT

A fluid control valve includes: a valve main body including an inlet port and an outlet port, each being formed on opposite side surfaces; and a mounting plate attached to a lower end of the valve main body; wherein the valve main body has side surfaces located perpendicular to the opposite side surfaces and formed with locking protrusions, the mounting plate is formed with locking arms each extending from an upper end of the mounting plate, the locking arms each having a locking pawl facing and engaging with the protrusion, the valve main body is formed with an annular rib about an central axis on the lower end of the valve main body, and the upper end of the mounting plate is formed with a press-fit rib including a press-fit portion press-fitted in a wall surface of the annular rib.

9 Claims, 14 Drawing Sheets

FLUID CONTROL VALVE

CROSS-REFERENCE TO RELATED APPLICATIONS

This application is based upon and claims the benefit of priority from the prior Japanese Patent Applications No. 2011-271355 filed on Dec. 12, 2011 and No. 2012-242891 filed on Nov. 2, 2012, the entire contents of which are incorporated herein by reference.

BACKGROUND OF THE INVENTION

1. Field of the Invention

The present invention relates to a fluid control valve to be used in a semiconductor manufacturing device and, particularly, to a locking structure of a valve main body and a mounting plate in a fluid control valve.

2. Related Art

In a cleaning process of a semiconductor manufacturing device, many fluid control valves are used in response to upsizing of semiconductor wafers, miniaturization of chips, multi-layered wiring, etc. For example, Patent Document 1 discloses a valve locking structure capable of easily installing those fluid control valves and also easily responding to changes of installing place or the like.

The technique in Patent Document 1 is configured to fix a valve main body to a mounting plate together with an actuator assembly, and lock the mounting plate in a predetermined position of a valve mounting bracket to be fastened to a semiconductor manufacturing device with screws. To be concrete, this valve locking structure is arranged such that a tap protruding from the mounting plate is inserted and engaged in an opening of a retaining clip formed on one side of an upper surface of the valve mounting bracket and also a hook at a distal end of a tab protruding from the other side of the upper surface of the valve mounting bracket is engaged with a raised portion formed on a side surface of the mounting plate.

RELATED ART DOCUMENTS

Patent Documents

Patent Document 1: JP-A-2004-526919

SUMMARY OF INVENTION

Problems to be Solved by the Invention

However, the technique disclosed in Patent Document 1 has the following disadvantages. In Patent Document 1, when the tap protruding from the mounting plate is to be inserted and engaged in the opening of the retaining clip formed on the one side of the upper surface of the valve mounting bracket, the valve main body has to be inserted in an inclined state. During insertion of the tab, therefore, the inclined valve main body may interfere with another fluid control valve placed in an adjacent position. Thus, adjacent fluid control valves have to be spaced with a clearance to prevent interference with each other. Accordingly, in Patent Document 1 where as many fluid control valves as possible could not be installed in a limited space, space efficiency problem occurs.

In Patent Document 1, furthermore, the valve locking structure is configured such that the tab protruding from the mounting plate is inserted and engaged in the opening of the retaining clip formed on the one side of the upper surface of the valve mounting bracket, and the hook at the distal end of the tab protruding from the other side of the upper surface of the valve mounting bracket is engaged with the raised portion formed on the side surface of the mounting plate. Accordingly, the protruding tab is warped or bent, the hook may disengage from the raised portion. Therefore, the mounting plate is provided with a screw tab to fasten the mounting plate to the valve mounting bracket after the hook is engaged. The technique in Patent Document 1 thus requires both of the locking means and the fastening means, resulting in troublesome mounting work.

For a cleaning process of semiconductor manufacturing devices, recent mainstream cleaning is sheet feed cleaning in response to upsizing of semiconductor wafers, miniaturization of chips, multi-layered wiring, etc. In the sheet feed cleaning, semiconductor wafers are cleaned one by one. Therefore, a cleaning time for one sheet needs to be shortened. In a cleaning work using a chemical liquid such as sulfuric acid, for example, the chemical liquid is heated to a high temperature (in the order of 80° C. to 90° C.) and then supplied to a cleaning nozzle in order to prompt chemical reaction. This causes repeated expansion and contraction of a chemical liquid control valve and its piping according to a change in temperature of the chemical liquid from a normal temperature to a high temperature (in the order of 80° C. to 90° C.). This expansion and contraction may cause looseness of a mounting portion of the chemical liquid control valve. Accordingly, the need for a valve mounting structure less influenced by the above temperature change (heat cycle) is increased. Furthermore, external forces which may cause looseness act on the mounting portion of the chemical liquid control valve not only from back, forth, right, and left, but also in a rotating direction about an axis.

The present invention has been made to solve the above problems and has a purpose to provide a fluid control valve configured such that a valve main body and a mounting plate can be simply and reliably locked in engagement with each other while keeping space efficiency and be less influenced by various external forces including a temperature change (heat cycle) of a fluid.

Means of Solving the Problems

To achieve the above purpose, one aspect of the invention provides a fluid control valve comprising: a valve main body including an inlet port and an outlet port each formed on opposite side surfaces; and a mounting plate attached to a lower end of the valve main body; wherein the valve main body is provided with locking protrusions in side surfaces perpendicular to the opposite side surfaces, the mounting plate is formed with locking arms each standing on an upper end of the mounting plate, the locking arms each having a locking pawl facing and engaging with the locking protrusions, the valve main body is formed with an annular rib about an central axis on the lower end of the valve main body, and the mounting plate is formed with a press-fit rib standing on the upper end of the mounting plate and including a press-fit portion press-fitted in a wall surface of the annular rib.

With the above configuration, the valve main body and the mounting plate can be simply and reliably locked while keeping space efficiency and be less influenced by various external forces including a temperature change (heat cycle) of a fluid.

To be concrete, the valve main body is formed with the locking protrusions on the side surfaces perpendicular to the above opposite side surfaces. The mounting plate is provided, on the upper end, with the locking arms each having the locking pawl facing and engaging with the protrusion. Accordingly, when the valve main body is simply inserted in an axial direction, the locking protrusions and the locking pawls are engaged with each other on the side surfaces of the valve main body. Thus, the mounting plate and the valve main body can be easily connected to each other. At that time, the locking arms standing in the positions to face the locking protrusions are warped in respective opening directions to receive the protrusions. Therefore, the valve main body does not need to be inclined as disclosed in Patent Document 1 to connect the mounting plate and the valve main body. This configuration does not deteriorate the space efficiency.

The lower end of the valve main body is formed with the annular rib about the central axis. The press-fit rib is provided standing on the upper end of the mounting plate. The press-fit rib includes the press-fit portion press-fitted in the wall surface of the annular rib. Thus, while the press-fit portion of the press-fit rib is press-fitted in the wall surface of the annular rib, the mounting plate and the valve main body can be connected to each other.

Therefore, a repulsion force is generated by press-fitting between the mounting plate and the valve main body. This repulsion force acts in an opposite direction (axial direction) to a direction in which the press-fit portion of the press-fit rib goes or bites into the wall surface of the annular rib and acts in an opposite direction (horizontal direction) to a direction in which the press-fit portion of the press-fit rib is compressed by the wall surface of the annular rib.

Herein, the repulsion force in the axial direction acts as an initial compression load on each abutting surface of the protrusions and the locking pawl engaging with each other on the side surfaces of the valve main body. Under this initial compression load, the protrusions and the locking pawls are locked to each other. Therefore, when the fluid control valve is seen from the side surface, the valve main body is supported at three points (referred to as a "three-point supporting using press-fit portions") under the initial compression load acting on the abutting surface (one point) of the protrusion and the locking pawl engaging with each other on each side surface of the valve main body and on the press-fit portions (two points) press-fitted in the wall surface of the annular rib. Even when the valve main body is subject to not only abrupt load but also continuous repeated load such as heat cycle caused by a fluid flowing through the valve main body, those loads are canceled out by the initial compression load. Thus, the locked state of the mounting plate and the valve main body is not loosened. Accordingly, the mounting plate and the valve main body are locked to each other under action of the initial compression load without loosening the locked state. This does not need any troublesome work such as screw tightening to the fixing screw tab disclosed in Patent Document 1. Therefore, the mounting plate and the valve main body can be reliably locked.

As above, the valve main body and the mounting plate can be easily and reliably locked to each other while keeping the space efficiency with less influence of various external forces including a temperature change (heat cycle) of a fluid.

DESCRIPTION OF EMBODIMENTS (First Embodiment)

Figure 1:
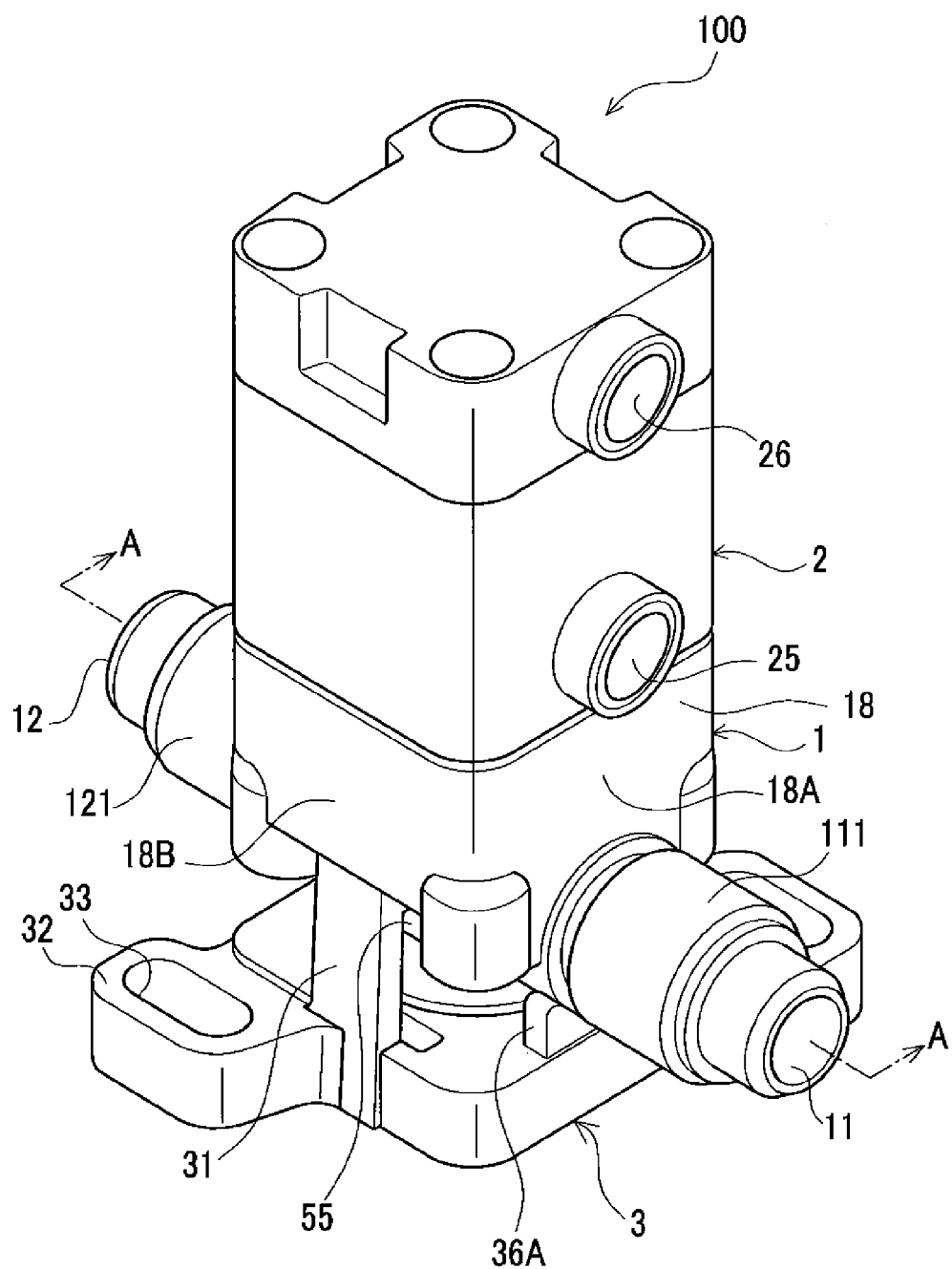
FIG. 1 is a perspective view of an entire fluid control valve of a first embodiment according to the present invention.
Figure 2:
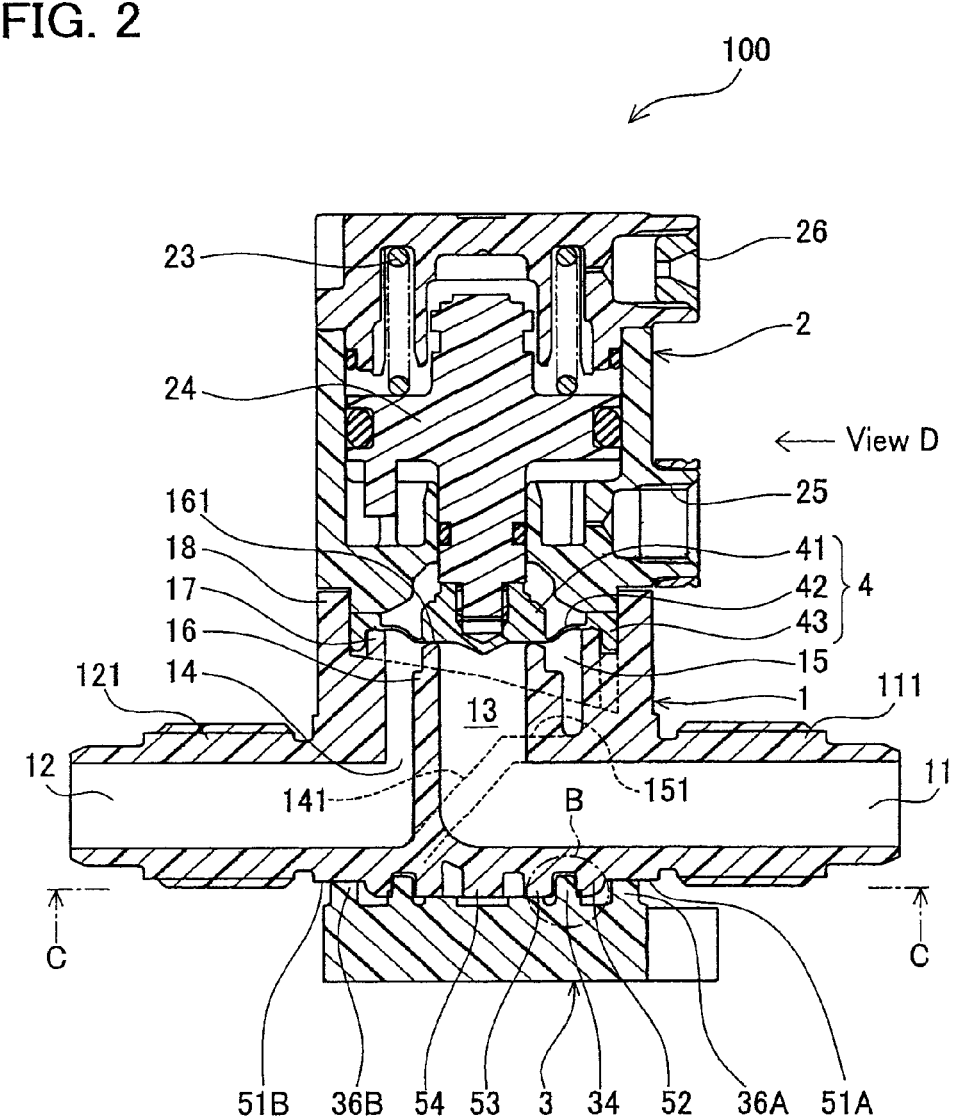
FIG. 2 is an A-A cross sectional view of the fluid control valve of FIG. 1, showing a valve closed state, in which a part B is illustrated as an X-X cross section in FIG. 4.
Figure 3:
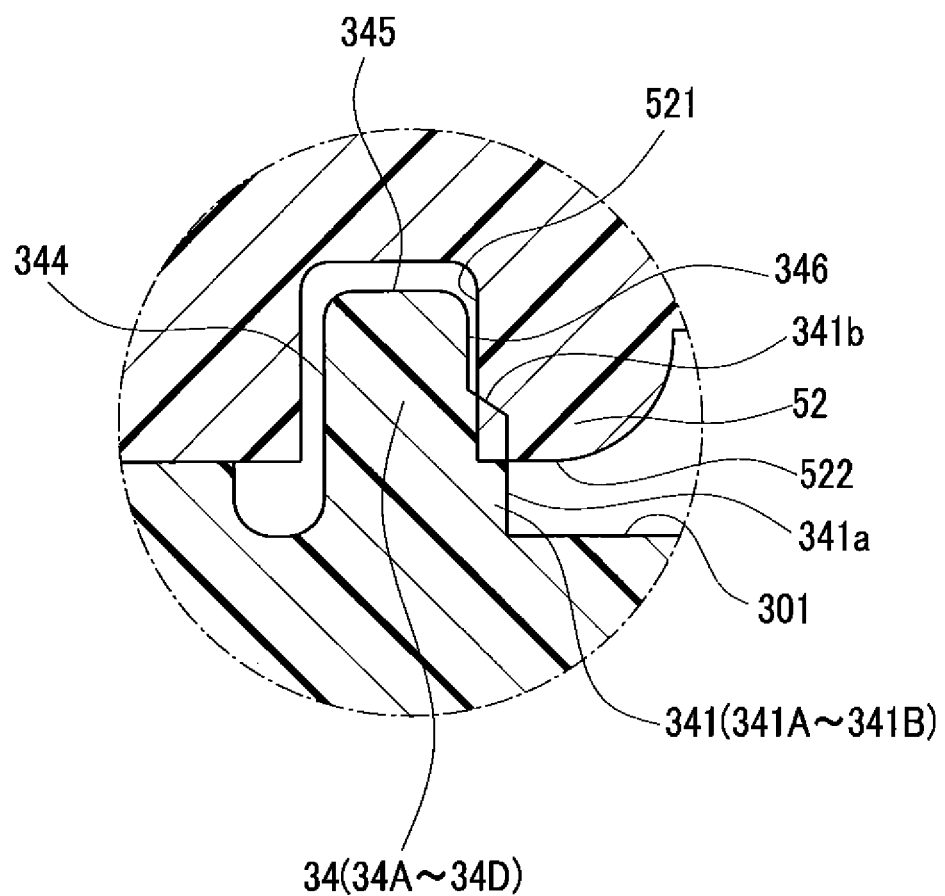
FIG. 3 is an enlarged cross sectional view of a press-fit portion (Part B) of the fluid control valve of FIG. 2.
Figure 4:
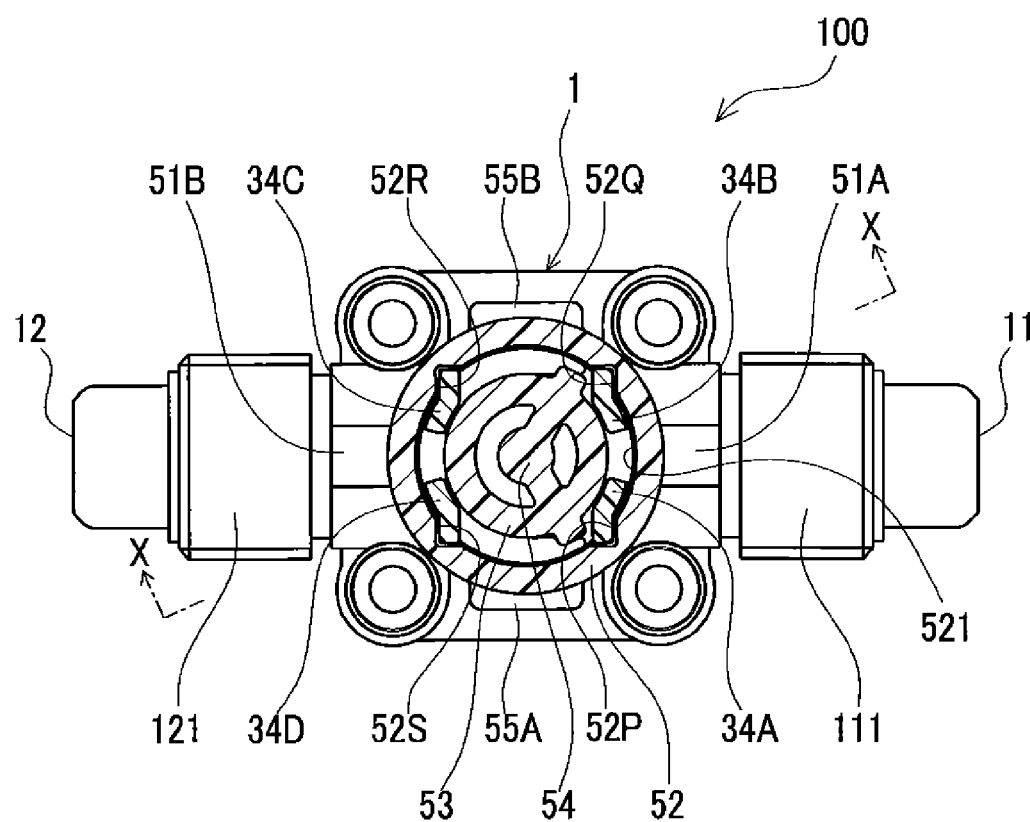
FIG. 4 is a C-C cross sectional view of the fluid control valve of FIG. 2.
Figure 5:
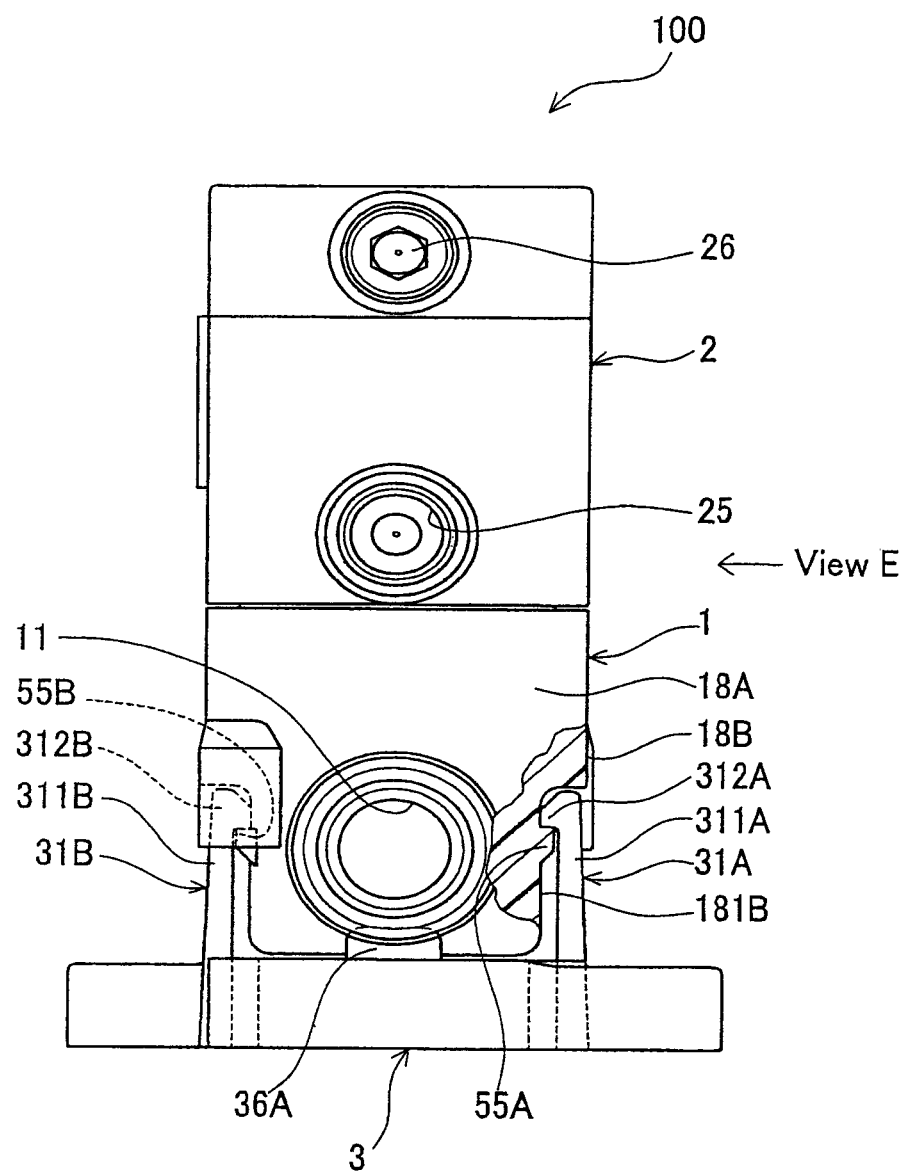
FIG. 5 is a front view (View D) of the fluid control valve of FIG. 2.
Figure 6:
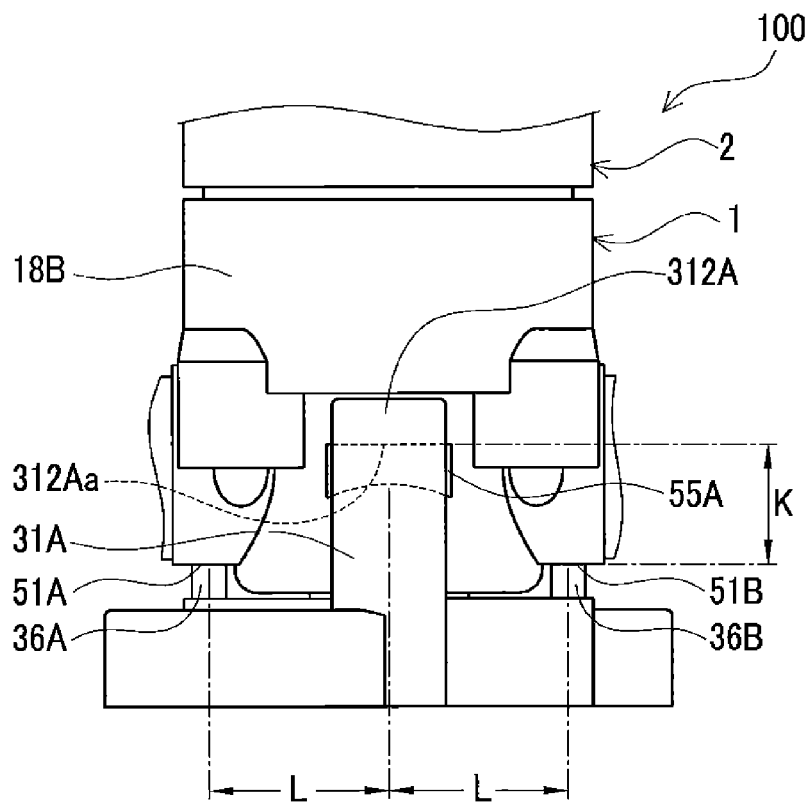
FIG. 6 is a partial side view (View E) of the fluid control valve of FIG. 5.
Figure 7:
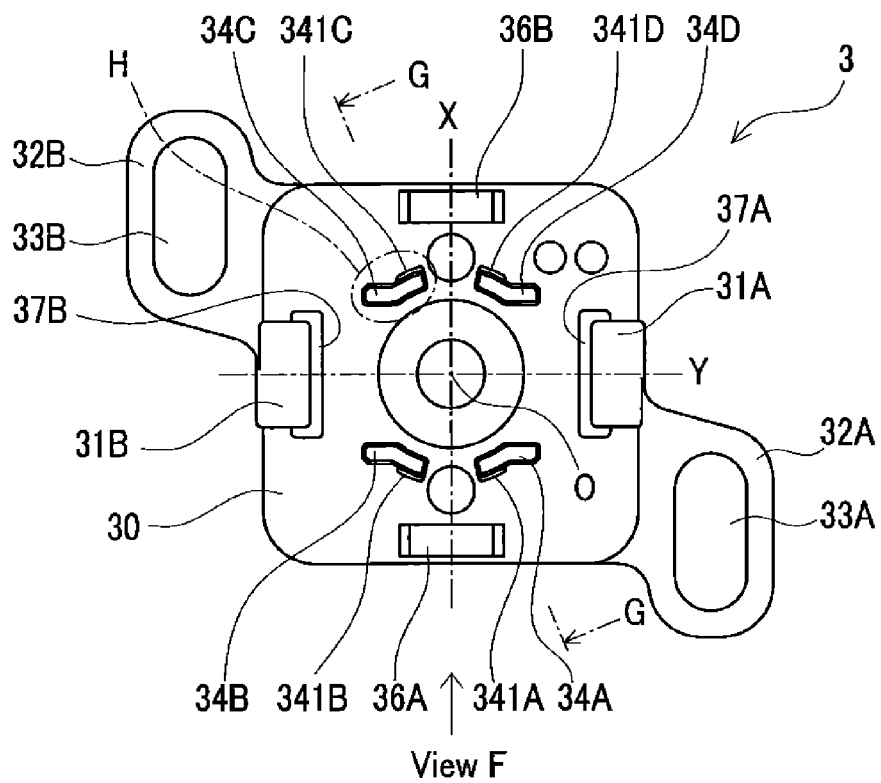
FIG. 7 is a top view of a mounting plate of the fluid control valve of FIG. 1.
Figure 8:
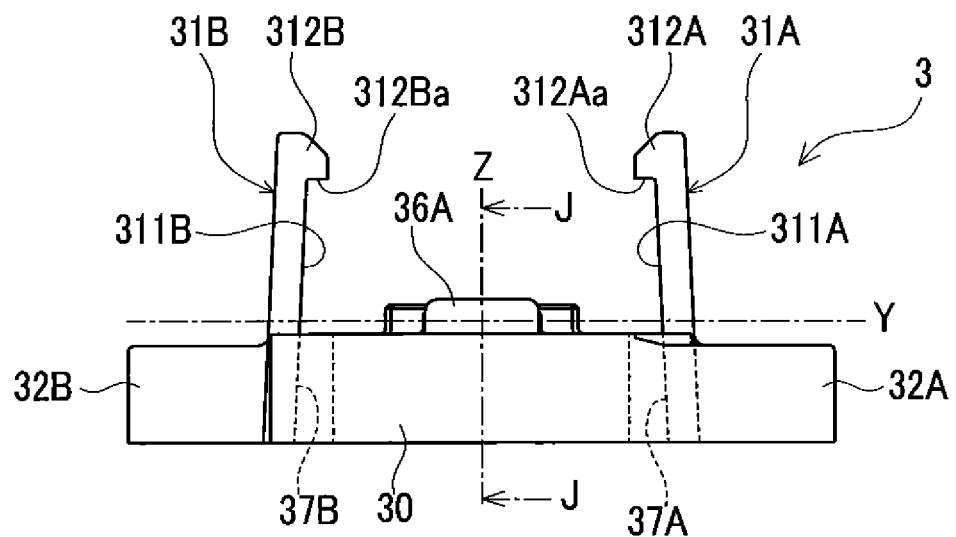
FIG. 8 is a front view (View F) of the mounting plate of FIG. 7.
Figure 9:
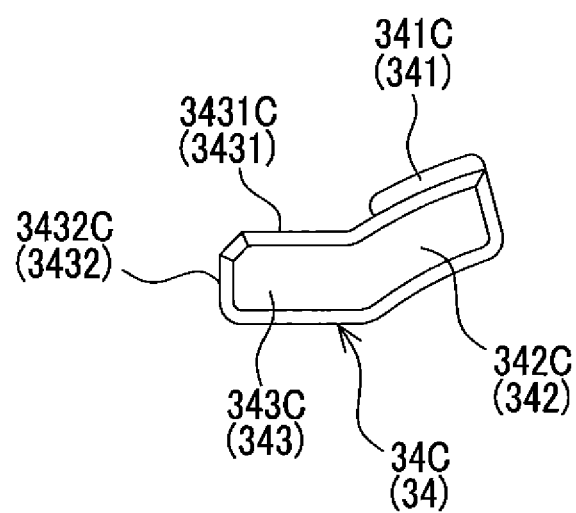
FIG. 9 is an enlarged view of a press-fit rib (Part H) of the mounting plate of FIG. 7.
Figure 10:
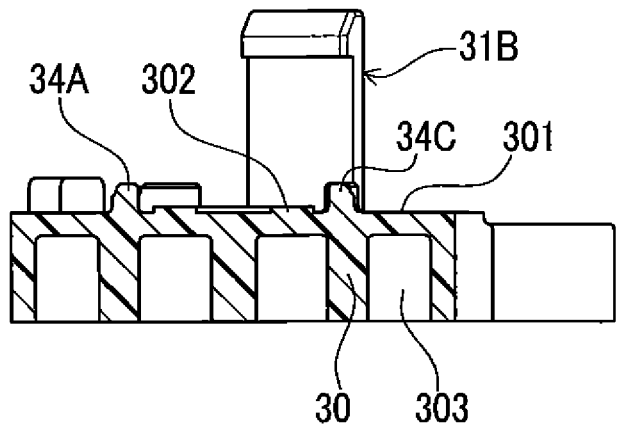
FIG. 10 is a G-G cross sectional view of the mounting plate of FIG. 7.
Figure 11:
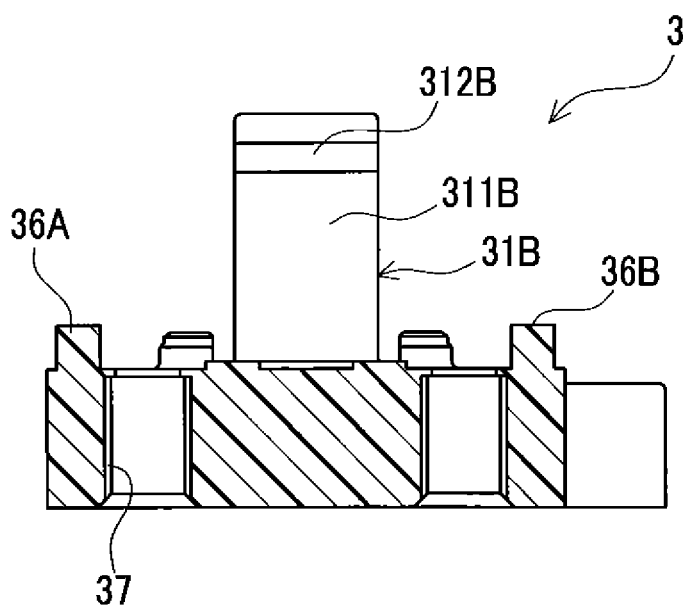
FIG. 11 is a J-J cross sectional view of the mounting plate of FIG. 8.

A detailed description of a preferred first embodiment of a fluid control valve embodying the present invention will now be given referring to the accompanying drawings. FIG. 1 is a perspective view of an entire fluid control valve of the first embodiment according to the invention. FIG. 2 is an A-A cross sectional view of the fluid control valve of FIG. 1, showing a valve closed state, in which a part B is illustrated as an X-X cross section in FIG. 4. FIG. 3 is a detailed cross sectional view of a press-fit portion (Part B) of the fluid control valve of FIG. 2. FIG. 4 is a C-C cross sectional view of the fluid control valve of FIG. 2. FIG. 5 is a front view (View D) of the fluid control valve of FIG. 2. FIG. 6 is a partial side view (View E) of the fluid control valve of FIG. 5. FIG. 7 is a top view of a mounting plate of the fluid control valve of FIG. 1. FIG. 8 is a front view (View F) of the mounting plate of FIG. 7. FIG. 9 is an enlarged view of a press-fit rib (Part H) of the mounting plate of FIG. 7. FIG. 10 is a G-G cross sectional view of the mounting plate of FIG. 7. FIG. 11 is a J-J cross sectional view of the mounting plate of FIG. 8.

The fluid control valve of the present embodiment can be installed in a semiconductor manufacturing device and used as, for example, a chemical liquid control valve. In the case where the fluid control valve is to be used as the chemical liquid control valve, a valve main body through which a chemical liquid passes is made of fluorine-based resin superior to corrosion resistance and heat resistance. As the fluorine-based resin, for example, PFA (Tetrafluoroethylene—perfluoroalkyl vinyl ether copolymer) is used. On the other hand, the mounting plate to which the valve main body is attached does not particularly need corrosion resistance and heat resistance and thus is made of PP (polypropylene), for example.

In the case where the fluid control valve is used as the chemical liquid control valve, for instance, cleaning using a chemical liquid such as sulfuric acid is performed by heating the chemical liquid to a high temperature (in the order of 80°

C. to 90° C.) to prompt chemical reaction and then supplying the heated chemical liquid to a cleaning nozzle. Accordingly, the chemical liquid control valve and its piping are apt to be influenced by the temperature of the chemical liquid changing from a normal temperature to a high temperature (in the order of 80° C. to 90° C.), thereby repeating expansion and contraction. The present inventors therefore configured a mounting structure that is less likely to loosen due to various external forces including the above temperature change.

<Whole Configuration of Fluid Control Valve>

Referring to FIG. 1, a fluid control valve 100 includes a valve main body 1, a valve upper body 2, and a mounting plate 3. The valve main body 1 has a rectangular boss portion 18, a protruding portion 111 formed to horizontally protrude from one of opposite side surfaces 18A of the boss portion 18 and provided with an inlet port 11, and a protruding portion 121 formed to horizontally protrude from the other of the side surfaces 18A and provided with an outlet port 12. On the upper end of the boss portion 18, the rectangular valve upper body 2 provided with an operation port 25 and an air vent 26 is placed and connected to the boss portion 18 with screws. Under the lower end of the boss portion 18, the flat plate-like mounting plate 3 is locked in engagement with the boss portion 18 through locking arms 31. Each locking arm 31 is formed with a locking pawl and to stand on an upper end of the mounting plate 3 in a position to face a protrusion 55 formed on each side surface 18B of the main body 1, perpendicular to the side surfaces 18A provided respectively with the inlet port 11 and the outlet port 12. The mounting plate 3 includes lugs 32 protruding diagonally in opposite directions, each lug 32 being formed with a mounting hole 33, which is a bolt through hole used in fixing the fluid control valve 100 to the semiconductor manufacturing device. The mounting plate 3 may be provided with screw holes 37 as shown in FIG. 11, in addition to the mounting holes 33.

As shown in FIG. 2, a diaphragm valve element 4 is held between the valve main body 1 and the valve upper body 2. The diaphragm valve element 4 consists of a main portion 41, a web portion 42 extending around the main portion 41, and a retainer portion 43 formed on the outer periphery of the web portion 42. The main portion 41 is connected to a piston 24 housed in the valve upper body 2. The piston 24 is urged in a valve closing direction by a compression spring 23. The piston 24 is moved upward by air supplied through the operation port 25 and downward by the urging force of the compression spring 23. The main portion 41 is moved up and down together with the piston 24.

As shown in FIG. 2, the boss portion 18 of the valve main body 1 is provided, on its inner peripheral side, an inner wall 16 and an outer wall 17 each vertically extending to form a double cylinder structure. The inner wall 16 is formed, at its upper end, with a valve seat 161. A valve chamber 15 opening on an upper side is provided between the inner wall 16 and the outer wall 17. This valve chamber 15 is an annular space defined between the inner wall 16 and the outer wall 17. The valve chamber 15 communicates, via the valve seat 161, with the inlet port 11 and the outlet port 12 formed on the opposite side surfaces 18A of the valve main body 1. An inflow passage 13 communicating with the valve chamber 15 via the valve seat 161 is formed like an L-shape extending vertically through the inner wall 16 from an open side and bending horizontally.

A chamber bottom 151 of the valve chamber 15 is formed, in a portion a little close to the outlet port 12 than the center, with an inclined surface 141 sloping down toward the outlet port 12. An outflow passage 14 is formed on the inclined surface 141 to extend from the outlet port 12 to the valve chamber 15.

<Press-fit Configuration to Annular Rib>

As shown in FIGS. 2 and 4, the bottom of the valve main body 1 is formed with an annular rib 52 having a predetermined thickness. The annular rib 52 is formed with a vertical wall surface on an inner circumferential side and an arc-shaped cross section on an outer circumferential side. An inner wall of the annular rib 52 is formed with four V-shaped depressed grooves 52P to 52S which are spaced circumferentially at equal intervals and arranged symmetrically about an axis. An open angle of each groove 52P to 52S is about 90°. On the inner circumferential side of the annular rib 52, an inside annular rib 53 is formed and, at the center, a resin injection portion 54 is formed. Those annular rib 52, inside annular rib 53, and resin injection portion 54 are equal in height. The annular rib 52 and the inside annular rib 53 are spaced with a predetermined clearance. In the clearance between the annular rib 52 and the inside annular rib 53, four press-fit ribs 34 (34A to 34D) each vertically extending from the upper end of the mounting plate 3 are inserted.

As shown in FIG. 3, each press-fit rib 34 has an almost rectangular cross section. A wall surface of each press-fit rib 34 facing the inner wall 521 of the annular rib 52 is formed with a press-fit portion 341 (341A to 341D) at a predetermined height from a base intersecting with an upper end 301 of the mounting plate 3. The press-fit portions 341 are press-fitted inside the inner wall 521 of the annular rib 52 in an axial direction. To uniformly press fit in the inner wall 521 of the annular rib 52, each press-fit portion 341 is formed with a vertical wall surface 341a providing a fixed wall thickness and a slant surface 341b sloping upward. A wall surface 346 above the press-fit portion 341 of the press-fit rib 34 is configured to be spaced apart from the inner wall 521 of the annular rib 52 to prevent interference therewith. An upper surface 345 and a back surface 344 of each press-fit rib 34 are also designed to prevent interference with the valve main body 1.

As shown in FIGS. 7 and 10, on the upper end 301 of a main body 30 of the mounting plate 3, the press-fit ribs 34 (34A to 34D) arranged at four positions symmetric about a central axis O of the main body 30, and a seat 302 is formed on the inside of the press-fit ribs 34 and placed in contact with the inside annular rib 53 of the valve main body 1. On the back surface of the main body 30, reinforcing ribs are provided at predetermined intervals. Between the reinforcing ribs, cutouts 303 are formed to prevent warping of the main body 30 during injection molding.

Assuming that a straight line passing the axis O in a front-back direction (in a direction linking the inlet port 11 and the outlet port 12) is referred to as X and a straight line passing the axis O in a right-left direction (in a direction perpendicular to the line X) is referred to as Y, adjacent two of four press-fit ribs 34A, 34B, 34C, and 34D, interposing therebetween the line X or Y, are symmetric with respect to the corresponding line. For instance, the press-fit ribs 34A and 34B are symmetric with respect to the line X.

As shown in FIGS. 4, 7, and 9, each press-fit rib 34 (34A to 34D) includes a curved portion 342 curving along the inner wall surface of the annular rib 52 and a straight portion 343 extending in parallel to the line Y, forming an obtuse-angled V shape in plan view. Each curved portion 342 has an outer wall formed with a press-fit portion 341 with a predetermined thickness. The press-fit portion 341 is to be press-fitted in the inner wall surface 521 of the annular rib 52. The press-fit portions 341 are placed at a long distance in the front-back direction. Since the press-fit portions 341 are largely spaced apart from each other in the front-back direction (the direction linking the inlet port 11 and the outlet port 12), the repulsion force generated by press-fitting of the press-fit portions 341 effectively acts against an external force applied from the inlet port 11 side or the outlet port 12 side. Accordingly, when a load associated with stop of supply of a chemical liquid and a load of temperature change (heat cycle) are transmitted to a chemical liquid control valve through pipes or tubes, the repulsion force resulting from press-fitting of the press-fit portions 341 effectively acts in a direction to cancel out those loads.

<Locking Structure and Supporting Structure>

As shown in FIGS. 5 and 6, in the valve main body 1, the side surfaces 18B perpendicular to the opposite side surfaces 18A provided with the inlet port 11 and the outlet port 12 are provided with recesses 181B. Locking protrusions 55A and 55B are formed respectively protruding outward from under the recesses 181B. The protrusions 55A and 55B engage with locking pawls 312A and 312B respectively formed at distal ends of locking arms 31A and 31B standing on the upper end of the mounting plate 3. An arm portion 311A of the locking arm 31A and an arm portion 311B of the locking arm 31B are set within the recesses 181B of the valve main body 1 without protruding outward from the side surfaces 18B. Thus, the fluid control valve 100 is entirely compact, contributing to improvement of space efficiency.

As shown in FIGS. 5 and 8, the locking arms 31A and 31B are provided standing at an angle on the upper surface of the mounting plate 3 so that respective distal ends are close to the valve main body 1 side. The inclination angle of each arm 31A and 31B is preferably in the order of 2° to 5°. The locking arms 31A and 31B inclined with such a small inclination angle are less likely to warp or bend in an opening direction. Accordingly, the locked state can be more easily maintained.

On the other hand, the locking pawls 312A and 31213 have chamfered upper ends to allow the locking arms 31A and 31B to easily warp in engaging the protrusions 55A and 55B. This configuration is made in consideration of assembling property of the valve main body 1 and the mounting plate 3. The mounting plate 3 is formed with cutout grooves 37A and 37B on a central axis side of the locking arms 31A and 31B. These grooves 37A and 37B serve to provide high flexibility of the roots of the locking arms 31A and 31B to prevent breakage of the arms 31A and 31B at the time of engagement with the protrusions 55A and 55B. The protrusions 55A and 55B and the locking pawls 312A and 312B have horizontal surfaces which abut on each other for engagement.

As shown in FIGS. 6 and 11, on both edge portions of the mounting plate 3 on the inlet port 11 side and the outlet port 12 side (on the line X in FIG. 7), support ribs 36A and 36B are each provided to extend vertically and arranged at the equal distance L from the center of each of the locking arms 31A and 31B provided in alignment with the central axis O in the Y direction in FIG. 7. The bottom of the valve main body 1 has flat surfaces 51A and 51B extending to the inlet port 11 side and the outlet port 12 side. These flat surfaces 51A and 51B can contact with the upper surfaces of the support ribs 36A and 36B with a fine gap therebetween. This fine gap is preferably in the order of 0.1 to 0.3 mm, for example.

When a larger external force than the repulsion force resulting from press-fitting of the press-fit portions 341 acts from the inlet port 11 side or the outlet port 12 side, contact surfaces (the upper surfaces) of the support ribs 36A and 36B can receive the lower end (the bottom) of the valve main body 1, thereby preventing wobble of the valve main body 1.

As shown in FIG. 6, a distance K between the contact surface of the support rib 36A and a lower surface 312Aa of the locking pawl 312A and between the contact surface of the support rib 36B and a lower surface 312Ba of the locking pawl 312B is preferably determined to be about half a distance of 2×L between the support ribs 36A and 36B. In this case, in an isosceles triangle defined by assuming a line between the support ribs 36A and 36B is a base, an inner angle between the base and an oblique line is about 45°. This configuration can disperse the external force uniformly in the front-back direction and the up-down direction.

Furthermore, as shown in FIG. 2, the support ribs 36A and 36B are arranged in positions to support the lower ends of the valve main body 1 on the inlet port 11 side and the outlet port 12 side located on the more outer circumferential side than the annular rib 52. Thus, the length of the base of the isosceles triangle (the distance between support points of the support ribs 36A and 36B=2×L) can be set longer than the distance between working points of the repulsion force resulting from press-fitting of the press-fit portions 341 (the distance between press-fit portions in the front-back direction=2×I (see FIG. 12)). Since the distance between the support points of the support ribs 36A and 36B is longer than the distance between the working points of the repulsion force (the distance between effort points), the repulsion force can be stably supported.

Referring to FIGS. 7 and 9, the straight portions 343 of the press-fit ribs 34 are arranged at circumferential equal intervals about the central axis O. Each straight portion 343 has a wall surface 3431 parallel to the line Y and a wall surface 3432 parallel to the line X. These wall surfaces 3431 and 3432 are in contact with the V-shaped depressed grooves 52P, 52Q, 52R, and 52S each opening at 90° in the annular rib 52 (see FIG. 4). The straight portions 343 of the press-fit ribs 34 are placed in contact with the depressed grooves 52P to 52S of the annular rib 52 support the valve main body 1 on the mounting surface of the mounting plate 3, thus restraining rotation of the main body 1 with respect to the mounting plate 3. Accordingly, the press-fit ribs 34 effectively act in a direction to cancel out the rotating force to rotate the fluid control valve 100 in a circumferential direction.

<Mechanism for Preventing Looseness Resulting from Press-Fitting>

Figure 12:
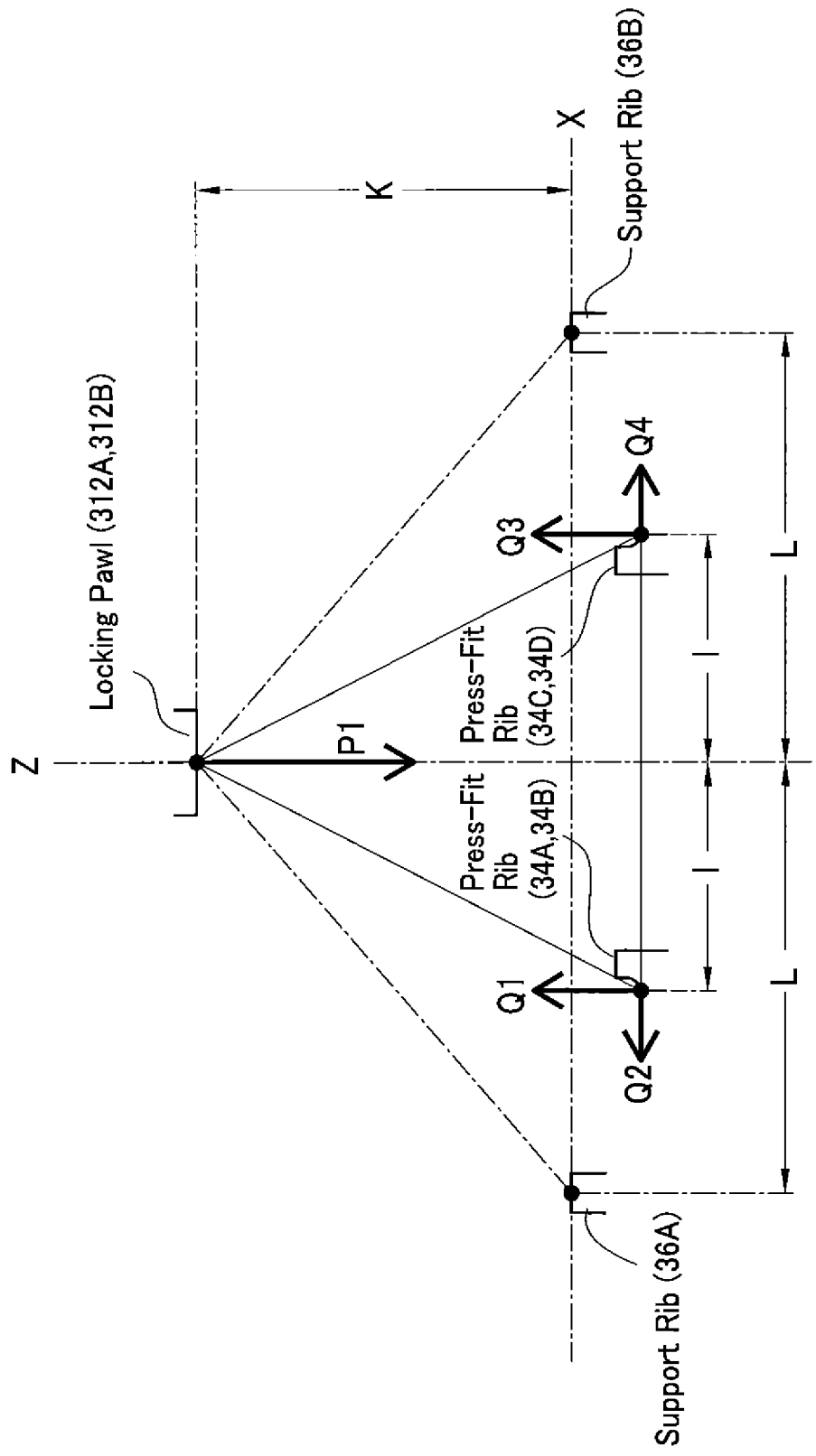
FIG. 12 is an explanatory diagram to explain a state of the fluid control valve of FIG. 1 supporting a repulsion force generated by press-fitting.

FIG. 12 is an explanatory view to explain a state of the fluid control valve 100 of FIG. 1 supporting the repulsion force resulting from press-fitting.

In FIG. 12, a repulsion force Q acting on the annular rib 52 provided on the bottom of the valve main body 1 when the press-fit portions 341A to 341D of the press-fit ribs 34A to 34D of the mounting plate 3 are press-fitted in the annular rib 52 is expressed by component forces Q2 and Q4 in the X direction and component forces Q1 and Q3 in a Z direction. The component forces Q2 and Q4 in the X direction act in opposite directions and cancel out each other.

However, the component forces Q1 and Q3 in the Z direction are received by the locking pawls 312A and 312B of the mounting plate 3 through the protrusions 55 of the valve main body 1. In the locking pawls 312A and 312B, a reactive force P1 occurs with double the power of each component force Q1, Q3.

Therefore, the protrusions 55 of the valve main body 1 are subjected to an initial compression load by the reactive force P1 twice as large as the power of each component force Q1, Q3 in the Z direction. Accordingly, even when the load associated with the stop of supply of a chemical liquid and the load of temperature change (heat cycle) are transmitted to the chemical liquid control valve through the pipes or tubes, for example, the reactive force P1 effectively acts to cancel out those loads.

As above, the press-fit portions 341A to 341D of the press-fit ribs 34A to 34D of the mounting plate 3 press-fitted in the annular rib 52 formed on the bottom of the valve main body 1 can prevent loosening of the locking pawls 312A and 312B. The distance L from the central axis O to each support rib 36A, 36B is longer than the distance I from the central axis O to each press-fit portion 341A to 341D, so that it advantageously acts against bending moment. By the presence of the support ribs 36A and 36B on the outer circumferential side of the annular rib 52, when a larger external force than the repulsion force resulting from press-fitting of the press-fit portions 341A to 341D acts from the inlet port 11 side or the outlet port 12 side, the contact surfaces of the support ribs 36A and 36B can receive the lower end of the valve main body 1, thereby preventing wobbling of the valve main body 1. Consequently, the locking pawls 312A and 312B can be further prevented from loosening.

(Second Embodiment)

Figure 13:
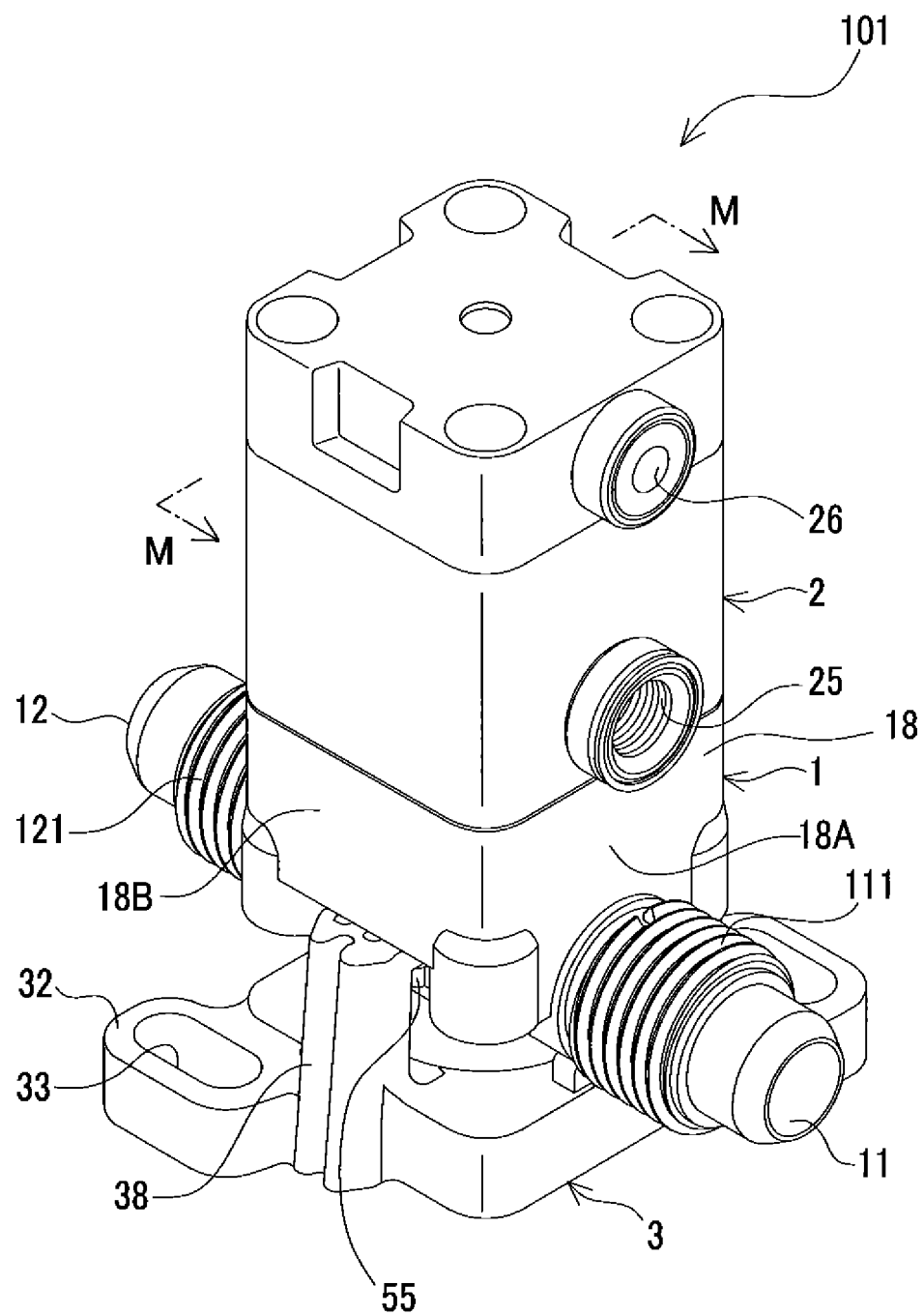
FIG. 13 is a perspective view of an entire fluid control valve of a second embodiment according to the invention.

A second embodiment of a fluid control valve according to the present invention will be explained in detail referring to the accompanying drawings. FIG. 13 is a perspective view of an entire fluid control valve of the second embodiment.

Figure 14:
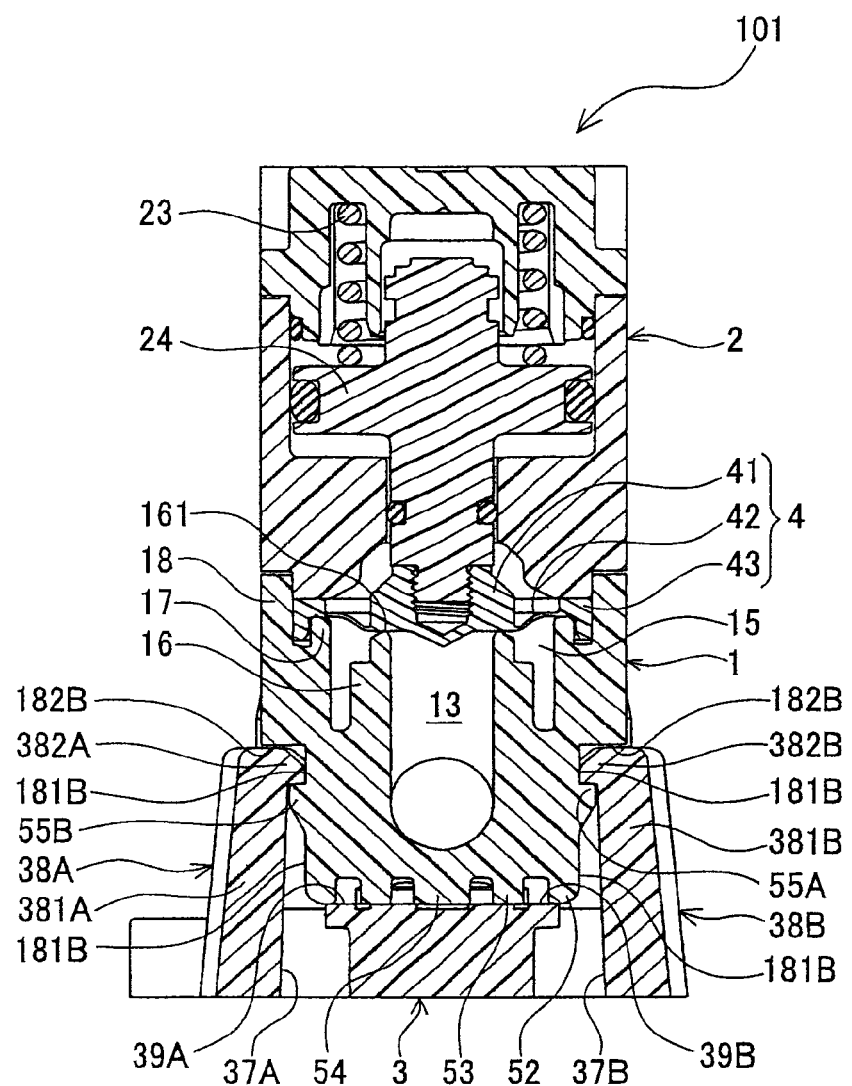
FIG. 14 is an M-M cross sectional view of the fluid control valve of FIG. 13, showing a valve closed state.
Figure 15:
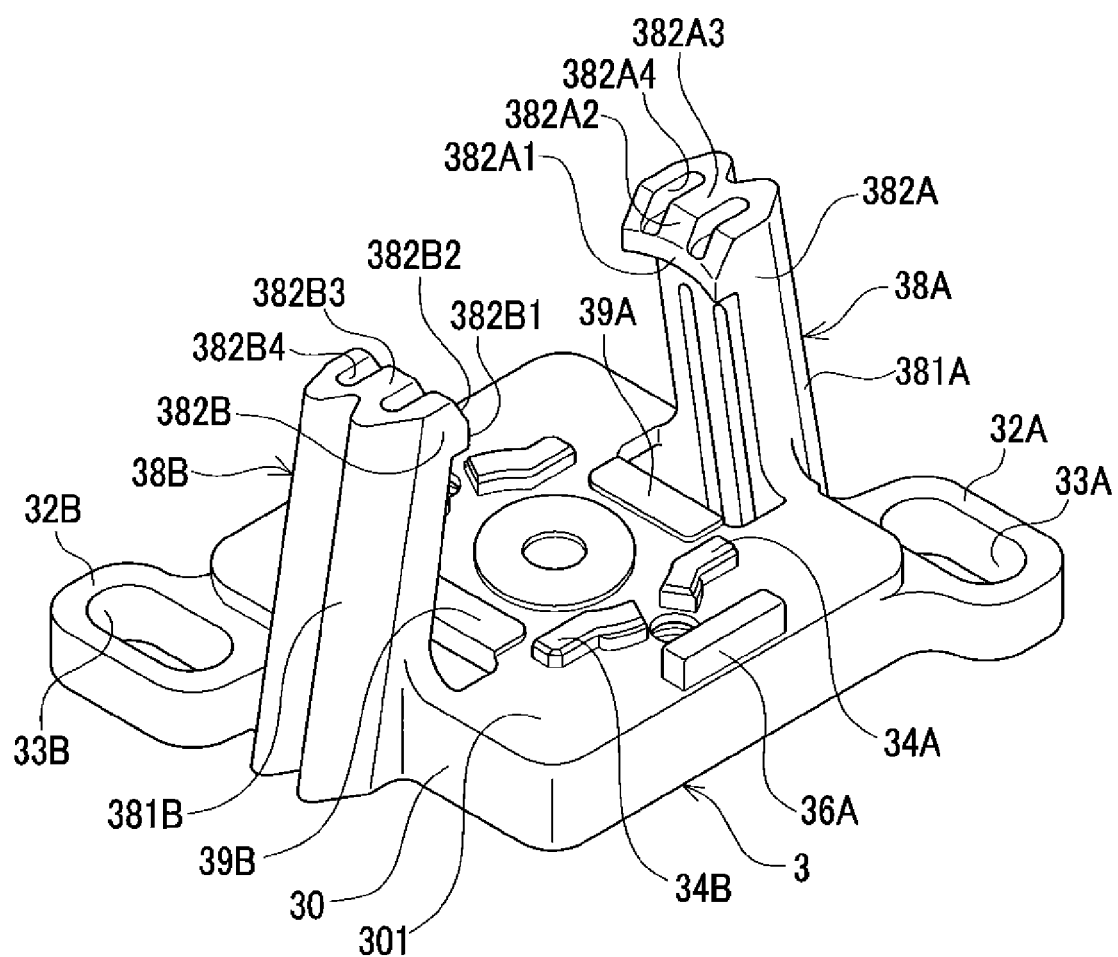
FIG. 15 is a perspective view of a mounting plate of the fluid control valve of FIG. 13.
Figure 16:
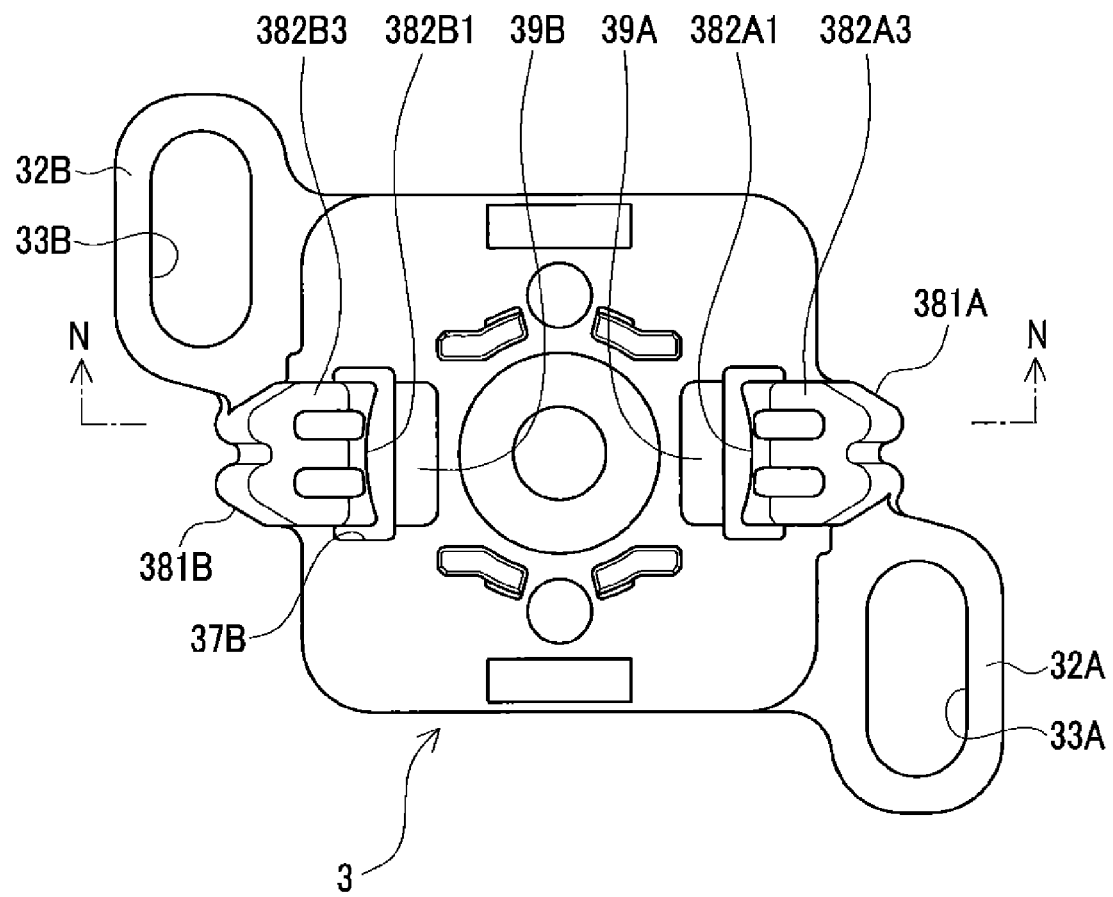
FIG. 16 is a top view of the mounting plate of the fluid control valve of FIG. 13.
Figure 17:
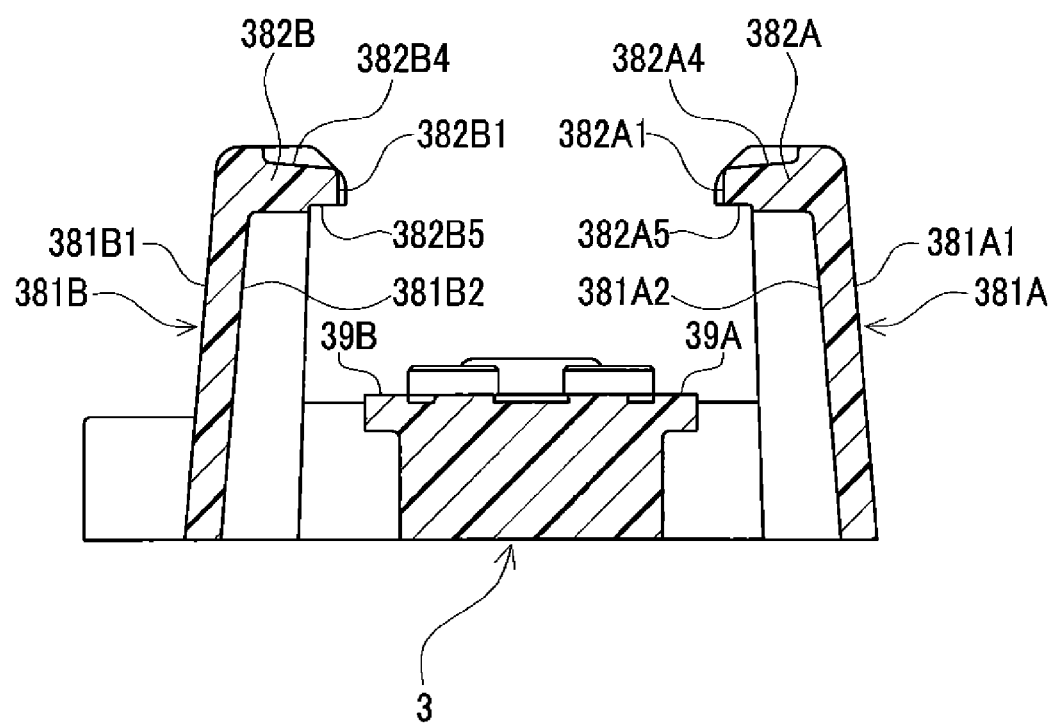
FIG. 17 is an N-N cross sectional view of the mounting plate of FIG. 16.

FIG. 14 is an M-M cross sectional view of the fluid control valve of FIG. 13 in a valve closed state. FIG. 15 is a perspective view of a mounting plate of the fluid control valve of FIG. 13. FIG. 16 is a top view of the mounting plate of the fluid control valve of FIG. 13. FIG. 17 is an N-N cross sectional view of the mounting plate of FIG. 16.

As with the fluid control valve of the first embodiment, the fluid control valve of the second embodiment can also be installed in a semiconductor manufacturing device and used as for example a chemical liquid control valve. In the case where the fluid control valve is to be used as the chemical liquid control valve, a valve main body through which a chemical liquid passes is made of fluorine-based resin superior to corrosion resistance and heat resistance. As the fluorine-based resin, for example, PFA (Tetrafluoroethylene—perfluoroalkyl vinyl ether copolymer) is used. On the other hand, the mounting plate to which the valve main body is attached does not particularly need corrosion resistance and heat resistance and thus is made of PP (polypropylene), for example.

In the case where fluid pipes are connected to an inlet port and an outlet port of a fluid control valve, a screw tightening torque of about 3 to 10 Nm, for example, acts on the fluid control valve. When the fluid pipes connected to the inlet port and the outlet port are subjected to a bending work, a bending load acts as a moment on the fluid control valve. When such screw tightening torque and bending load act on the fluid control valve, the valve main body is apt to disengage from a locking pawl of a mounting plate. Therefore, the present inventors configured a locking structure less likely to disengage against various external forces such as the screw tightening torque and bending load.

<Whole Configuration of Fluid Control Valve>

Referring to FIG. 13, a fluid control valve 101 includes the valve main body 1, the valve upper body 2, and the mounting plate 3. The valve main body 1 has the rectangular boss portion 18, the protruding portion 111 formed to horizontally protrude from one of opposite side surfaces 18A of the boss portion 18 and provided with the inlet port 11, and the protruding portion 121 formed to horizontally protrude from the other of the side surfaces 18A and provided with the outlet port 12. On the upper end of the boss portion 18, the rectangular valve upper body 2 provided with the operation port 25 and the air vent 26 is placed and connected to the boss portion 18 with screws. Under the lower end of the boss portion 18, the flat plate-like mounting plate 3 is locked in engagement with the boss portion 18 through locking arms 38. Each locking arm 38 is formed with a locking pawl and to stand on the upper end of the mounting plate 3 in a position to face the protrusion 55 formed on each side surface 18B of the valve main body 1, perpendicular to the side surfaces 18A provided respectively with the inlet port 11 and the outlet port 12. The mounting plate 3 includes lugs 32 protruding diagonally in opposite directions, each lug 32 being formed with a mounting hole 33, which is a bolt through hole used in fixing the fluid control valve 101 to the semiconductor manufacturing device.

Herein, the valve main body 1 and the valve upper body 2 of the fluid control valve 101 of the second embodiment are identical to the valve main body 1 and the valve upper body 2 of the fluid control valve 100 of the first embodiment. Further, the mounting plate 3 of the fluid control valve 101 of the second embodiment is identical to the mounting plate 3 of the fluid control valve 100 of the first embodiment, excepting the locking arms 38 and support seats 39A and 39B which will be mentioned later (see FIG. 15).

Accordingly, the fluid control valve 101 of the second embodiment, excepting the locking arms 38 and the support seats 39A and 39B of the mounting plate 3 (see FIG. 15), will be explained with the same reference signs as those in the fluid control valve 100 of the first embodiment. The details thereof are basically omitted except for as needed.

<Locking Structure and Supporting Structure>

As shown in FIGS. 13 and 14, in the valve main body 1, the side surfaces 18B perpendicular to the opposite side surfaces 18A provided with the inlet port 11 and the outlet port 12 are provided with recesses 181B. Locking protrusions 55A and 55B are formed respectively protruding outward from under the recesses 181B. The protrusions 55A and 55B engage with locking pawls 382A and 382B respectively formed at distal ends of locking arms 38A and 38B standing on the upper end of the mounting plate 3. The valve main body 1 is formed, on the side surfaces 18B, with flange portions 182B in a direction perpendicular to the recesses 181B so that flange portions 182B face the distal ends of the locking pawls 382A and 382B. Between each of the distal ends of the locking arms 38A and 38B and the corresponding flange portions 182B, a clearance is provided so that they do not interfere with each other in a locked state. For example, the clearance is preferably in the order of 0.3 to 0.5 mm. The reason why such a degree of clearance is needed is in that the distal ends of the locking arms 38A and 38B draw a circular arc in engaging with the protrusions 55A and 55B. Since the clearance between the distal end of the locking arm 38A and the flange portion 182B and the clearance between the distal end of the locking arm 38B and the flange portion 182B are set to be as small as possible so that they do not interfere with each other in the locked state, it is possible to easily prevent the valve main body 1 and the mounting plate 3 in the locked state from wobbling or inclining mainly in a vertical direction due to various external forces associated with a work for pipe connection with the inlet port 11 and the outlet port 12 of the fluid control valve 101 and other works.

The mounting plate 3 is formed with the cutout grooves 37A and 37B on the central axis side of the locking arms 38A and 38B. The support seats 39A and 39B are formed in positions adjacent to the locking arms 38A and 38B across the cutout grooves 37A and 37B to support the lower end of the annular rib 52 of the valve main body 1. The valve main body 1 is configured to be clamped in a vertical direction by the support seats 39A and 39B and the locking pawls 382A and 382B of the mounting plate 3. This configuration can easily prevent the valve main body 1 and the mounting plate 3 in the locked state from wobbling or inclining mainly in a vertical direction due to various external forces associated with a work for pipe connection with the inlet port 11 and the outlet port 12 of the fluid control valve 101 and other works.

While the valve main body 1 is locked to the mounting plate 3, a fine clearance is preferably provided between each of the support seats 39A and 39B and the lower end of the annular rib 52. This fine clearance is preferably in the order of 0.1 to 0.3 mm, for example. The reason why the fine clearance is provided is to make the repulsion force resulting from press-fitting of the press-fit ribs 34 effectively act.

As shown in FIGS. 15 and 16, the locking arms 38A and 38B are provided respectively with chevron beads 381A and 381B each protruding on opposite sides to the central axis and extending in a longitudinal direction. Each of the chevron beads 381A and 381B has a W-shaped cross section with a recessed apex. Those chevron beads 381A and 381B formed in such an almost W-shaped cross section enhance rigidity of the locking arms 38A and 38B in the longitudinal direction. The chevron beads 381A and 381B having the almost W-shaped cross section can also enhance screw rigidity.

Herein, the locking arms 38A and 38B are inclined so that respective distal ends are close to the central axis side (the valve main body 1 side) as shown in FIG. 17. The inclination angle is preferably in the order of 2° to 5°. This is to prevent disengagement between the locking pawl 382A and the protrusion 55B and between the locking pawl 382B and the protrusion 55A. Further, the locking pawls 382A and 382B include abutting surfaces 382A5 and 382B5 formed horizontal respectively to come into contact with the protrusions 55B and 55A. This is to prevent the axis-side ends 382A1 and 382B1 from interfering with the protrusions 55B and 55A when the locking pawls 382A and 382B enter therein. Each locking arm 38A and 38B is formed, on the central axis side, with grooves 381A2 and 381B2 as lightening holes to uniformize the thickness. This is to prevent internal defects such as voids.

The inner peripheral surfaces (the axis-side ends 382A1 and 382B1) of the locking pawls 382A and 382B are formed in a curve (concave) as shown in FIGS. 15 and 16. Herein, since the outer peripheral surfaces of the recesses 181B of the valve main body 1 (see FIG. 14) are formed in a curve (convex), the inner peripheral surfaces of the locking pawls 382A and 382B (the axis-side ends 382A1 and 382B1) are shaped to hold or surround the outer peripheral surface of the valve main body 1. By this holding shape, the locking pawls 382A and 382B restrict horizontal movement of the outer peripheral surface of the valve main body 1. This makes it possible to prevent the valve main body 1 and the mounting plate 3 in the locked state from wobbling or inclining mainly in the horizontal direction due to various external forces associated with a work for pipe connection with the inlet port 11 and the outlet port 12 of the fluid control valve 101 and other works.

In the locking pawls 382A and 382B, respectively, a slant portion 382A2 is formed between the axis-side end 382A1 and the distal end 382A3 and a slant portion 382B2 is formed between the axis-side end 382B1 and the distal end 382B3. The slant portions 382A2 and 382B2 act to allow the locking arms 38A and 38B having enhanced rigidity in the longitudinal direction to warp to the opposite side to the central axis when the valve main body 1 is to be locked to the mounting plate 3. Furthermore, grooves 382A4 and 382B4 are formed respectively in the distal ends 382A3 and 382B3 and the slant portions 382A2 and 382B2 of the locking pawls 382A and 382B to form lightening holes to uniformize the thickness. This is to prevent internal defects at the time of injection molding.

<Operations and Effects>

As explained in detail above, the fluid control valve 100 of the first embodiment can provide the following operations and advantageous effects.

Specifically, the valve main body 1 is formed with the locking protrusions 55A and 55B on the side surfaces 18B perpendicular to the opposite side surfaces 18A, and the mounting plate 3 is provided with the locking arms 31A and 31B standing on its upper end to face the protrusions 55A and 55B. The arms 31A and 31B include the locking pawls 312A and 312B engageable with the protrusions 55A and 55B. The valve main body 1 has only to be inserted to the mounting plate 3 in an axial direction, thereby brining the protrusions 55A and 55B on the side surfaces 18B of the valve main body 1 respectively into engagement with the locking pawls 312A and 312B. Thus, the valve main body 1 can be easily connected to the mounting plate 3. At that time, the locking arms 31A and 31B standing to face the protrusions 55A and 55B are warped in respective opening directions to receive the protrusions 55A and 55B respectively. Accordingly, when the mounting plate 3 and the valve main body 1 are to be connected, the valve main body does not have to be inclined as disclosed in Patent Document 1. Thus, the space efficiency is not deteriorated.

The annular rib 52 is formed about the central axis on the lower end of the valve main body 1. The press-fit ribs 34 are provided extending vertically from the upper end 301 of the mounting plate 3, each press-fit rib 34 including the press-fit portion 341 to be press fitted in the inner wall surface 521 of the annular rib 52. When the press-fit portions 341 of the press-fit ribs 34 are press fitted in the inner wall surface 521 of the annular rib 52, the mounting plate 3 and the valve main body 1 can be connected to each other.

Accordingly, a repulsion force resulting from press-fitting occurs between the mounting plate 3 and the valve main body 1. This repulsion force acts in an opposite direction (an axial direction) to a direction in which the press-fit portions 341 of the press-fit ribs 34 goes or bites into the inner wall surface 521 of the annular rib 52 and in an opposite direction (a horizontal direction) to a direction in which the press-fit portions 341 of the press-fit ribs 34 are compressed by the inner wall surface 521 of the annular rib 52.

The repulsion force in the axial direction acts as the initial compression load on the abutting surfaces of the protrusions 55A and 55B of the side surfaces 18B of the valve main body 1 and the locking pawls 312A and 312B. Under the initial compression load, the locking pawl 312A is engaged in the protrusion 55A and the locking pawl 312B is engaged in the protrusion 55B. When the fluid control valve 100 is seen from the side surface, therefore, the valve main body 1 is supported at three points (three-point supporting using press-fit portions) under the initial compression load applied at the abutting surface (one point) of the protrusion 55A or 55B of the side surfaces 18B of the valve main body 1 and the locking pawl 312A or 312B and the press-fit portions 341 (two points) press-fitted in the inner surface 521 of the annular rib 52. Therefore, when not only an abrupt load but also continuous repeated load such as heat cycle generated by a fluid flowing through the valve main body 1 act on the valve main body 1, those loads are canceled out by the initial compression load. Thus, the locked state of the mounting plate 3 and the valve main body 1 is not loosened. The mounting plate 3 and the valve main body 1 are thus locked under the initial compression load, without loosening the locked state, and can be reliably locked without needing a troublesome work as in Patent Document 1 using screw tightening with respect to a fixing screw tab.

According to the first embodiment, therefore, the valve main body 1 and the mounting plate 3 can be reliably locked with a simple configuration while keeping the space efficiency, and less influenced by various external forces including the fluid temperature change (heat cycle).

In the first embodiment, the mounting plate 3 is formed with the protruding support ribs 36A and 36B to support the lower end of the valve main body 1 on the inlet port 11 side and the outlet port 12 side located on the more outer circumferential side than the annular rib 52. When the fluid control valve 100 is seen from the side surface, external loads acting on the valve main body 1 can be received at three points (referred to as a "three-point supporting using support ribs"), i.e., at the abutting surface (one point) of the protrusion 55A or 55B of the side surface 18B of the valve main body 1 and the locking pawl 312A or 312B and the contact surfaces (two points) of the support ribs 36A and 36B on the inlet port 11 side and the outlet port 12 side supporting the lower end of the valve main body 1. The support ribs 36A and 36B support the lower end of the valve main body 1 on the inlet port 11 side and the outlet port 12 side located on the more outer circumferential side than the annular rib 52. Thus, the length of the base in the above three-point supporting using support ribs is longer than the length of the base in the three-point supporting using press-fit portions. Further, the flat surfaces 51A and 51B extending toward the inlet port 11 and the outlet port 12 on the bottom of the valve main body 1 and the upper surfaces of the support ribs 36A and 36B are spaced with a slight clearance to allow contact with each other.

Accordingly, the valve main body 1 supported by the support ribs 36A and 36B can be prevented from wobbling due to a larger external force than the initial compression load resulting from press-fitting. Since wobbling of the valve main body 1 can be prevented, the locked state of the mounting plate 3 and the valve main body 1 is further less likely to loosen.

According to the first embodiment, therefore, the valve main body 1 and the mounting plate 3 can be more reliably locked without being influenced by the larger external force than the initial compression load resulting from press-fitting.

In the first embodiment, the inner wall surface 521 of the annular rib 52 is formed with the depressed grooves 52P, 52Q, 52R, and 52S which contact with the wall surfaces of the press-fit ribs 34 excepting the press-fit portions 341. This can reliably inhibit rotation of the valve main body 1 about the central axis.

Even when an attempt is made to grasp and rotate the valve main body 1 about the axis, for example, the depressed groove 52R formed in the inner wall surface of the annular rib 52 is in contact with the wall surfaces 3431C and 3432C of the straight portion 343C of the press-fit rib 34C and thus can receive the rotating force. In case the rotating force is not received, the locking arms 31A and 31B provided standing on the upper end of the mounting plate 3 are liable to warp, resulting in disengagement between the protrusions 55A and 5513 and the locking pawls 312A and 312B.

Therefore, the depressed grooves 52P to 52S formed in the inner wall surface 521 of the annular rib 52 are in contact with the wall surfaces of the straight portions 343A to 343D of the press-fit ribs 34A to 34D, so that the rotation of the valve main body 1 about the axis is reliably inhibited, thus preventing disengagement between the protrusion 55A and the locking pawl 312A and between the protrusion 55B and the locking pawl 312B.

According to the first embodiment, consequently, the valve main body 1 and the mounting plate 3 can also be easily and reliably locked to each other against the external force in the rotating direction.

In the first embodiment, the press-fit ribs 34 are arranged symmetrically with respect to the central axis. Thus, the repulsion force resulting from press-fitting occurs symmetrically about the axis between the valve main body 1 and the mounting plate 3. Therefore, wobbling is less likely to occur between the valve main body 1 and the mounting plate 3 even when external forces act thereon in different directions. The mounting plate 3 is less likely to detach from the valve main body 1.

In the first embodiment, accordingly, the repulsion force resulting from press-fitting acts, with good balance, against the external forces applied from different directions. This makes it possible to easily and reliably lock the valve main body 1 and the mounting plate 3.

In the first embodiment, the press-fit portions 341 are formed at a predetermined height from the bases of the press-fit ribs 34. The repulsion force at the time of press-fitting can be determined in consideration of deformation property and workability and others of the valve main body 1 and the mounting plate 3.

Specifically, the rigidity of the valve main body 1 and the mounting plate 3 is changed according to a material, rib thickness, and other conditions of the fluid control valve 100. When the valve main body 1 is to be attached to the mounting plate 3, excessive repulsion force in press-fitting results in poor workability. Since the press-fit portions 341 is designed to have the predetermined height from the bases of the press-fit ribs 34, the repulsion force in press-fitting can be adjusted to an optimal value in terms of looseness, deformation property, workability, and others at the time of press-fitting.

The press-fit portions 341 are provided close to the bases of the press-fit ribs 34, so that the upper wall surfaces 346 of the press-fit portions 341 are shaped to provide a clearance to serve as a guide surface for the annular rib 52 when it goes or bites into the press-fit portions 341.

According to the first embodiment, therefore, the valve main body 1 and the mounting plate 3 can be easily and reliably locked while ensuring deformation property and workability.

In the first embodiment, each press-fit rib 34 includes the curved portion 342 extending along the inner wall surface 521 of the annular rib 52 and the press-fit portion 341 is provided in the curved portion 342. Accordingly, a press-fitting load uniformly acts on the inner wall surface 521 of the annular rib 52. Uniformizing the press-fitting load enables size reduction of the annular rib 52 and the press-fit ribs 34, leading to a reduction in rib thickness.

According to the first embodiment, such a size reduction can provide the space efficiency more effectively, so that the valve main body 1 and the mounting plate 3 can be easily and reliably locked.

Furthermore, the fluid control valve 101 of the second embodiment can provide the following operations and advantageous effects.

In the second embodiment, the mounting plate 3 is formed with the support ribs 36A and 36B to support the lower end of the valve main body 1 on the inlet port 11 side and the outlet port 12 side more outside than the annular rib 52. When the fluid control valve 101 is seen from the side surface, external loads acting on the valve main body 1 can be received at three points (referred to as a "three-point supporting using support ribs"), i.e., at the abutting surface (one point) of the protrusion 55A or 55B of the side surface 18B of the valve main body 1 and the locking pawl 382A or 382B and the contact surfaces (two points) of the support ribs 36A and 36B on the inlet port 11 side and the outlet port 12 side supporting the lower end of the valve main body 1. The support ribs 36A and 36B support the lower end of the valve main body 1 on the inlet port 11 side and the outlet port 12 side located on the more outer circumferential side than the annular rib 52. Thus, the length of the base in the above three-point supporting using support ribs is longer than the length of the base in the three-point supporting using press-fit portions. Further, the flat surfaces 51A and 51B extending toward the inlet port 11 and the outlet port 12 on the bottom of the valve main body 1 and the upper surfaces of the support ribs 36A and 36B are spaced with a slight clearance to allow contact with each other.

Accordingly, the valve main body 1 supported by the support ribs 36A and 36B can be prevented from wobbling in the arrangement direction of the support ribs 36A and 36B due to a larger external force than the initial compression load resulting from press-fitting. Since wobbling of the valve main body 1 can be prevented, the locked state of the mounting plate 3 and the valve main body 1 is further less likely to loosen.

According to the second embodiment, therefore, the valve main body 1 and the mounting plate 3 can be more reliably locked without being influenced by the larger external force than the initial compression load resulting from press-fitting.

Further, the upper end 301 is formed with the support seats 39A and 39B in the positions adjacent to the locking arms 38A and 38B respectively to support the lower end of the valve main body 1. Accordingly, the valve main body 1 can be configured to be clamped in an almost vertical direction by the support seats 39A and 39B and the locking pawls 382A and 382B of the mounting plate 3. This configuration can easily prevent the valve main body 1 and the mounting plate 3 in the locked state from wobbling or inclining in the arrangement direction of the support seats 39A and 39B due to external force applied thereto mainly in the vertical direction.

According to the second embodiment, therefore, the valve main body 1 and the mounting plate 3 can be less likely to be influenced by the larger external force than the initial compression load resulting from press-fitting and can be reliably locked with a simple configuration while preventing wobbling and inclining due to the external forces applied thereto mainly in the vertical direction.

In the second embodiment, the inner peripheral surfaces of the locking pawls 382A and 382B (the axis-side ends 382A1 and 382B1) are shaped respectively to hold or surround the outer peripheral surface of the recesses 181B of the valve main body 1 (see FIG. 14). Thus, the locking pawls 382A and 382B can restrict movement of the outer peripheral surfaces of the recesses 181B of the valve main body 1 (see FIG. 14) in a substantially horizontal direction. This can facilitate to prevent wobbling and inclining of the valve main body 1 and the mounting plate 3 in the locked state due to the external force applied thereto mainly in the horizontal direction.

According to the second embodiment, therefore, the valve main body 1 and the mounting plate 3 can be easily and reliably locked to each other while preventing wobbling and inclining due to the external force applied mainly in the horizontal direction.

In the second embodiment, the inner wall surface 521 of the annular rib 52 is formed with the depressed grooves 52P, 52Q, 52R, and 52S that contact with the wall surfaces of the press-fit ribs 34 excepting the press-fit portions 341. The upper end 301 of the mounting plate 3 is formed with the support seats 39A and 39B in the positions adjacent to the locking arms 38A and 38B to support the lower end of the valve main body 1. Accordingly, the depressed grooves 52P, 52Q, 52R, and 52S of the annular rib 52 that contact with the wall surfaces of the press-fit ribs 34 excepting the press-fit portions 341 can reliably inhibit rotation of the main body 1 about the central axis, thereby preventing disengagement between the protrusion 55B and the locking pawl 382A and between the protrusion 55A and the locking pawl 382B. This also can clamp the valve main body 1 in the substantially vertical direction by the support seats 39A and 39B and the locking pawls 382A and 382B of the mounting plate 3. Therefore, the valve main body 1 and the mounting plate 3 in the locked state can be easily prevented from wobbling and inclining due to the external forces applied in the rotating direction and the vertical direction.

According to the second embodiment, consequently, the valve main body 1 and the mounting plate 3 can be easily and reliably locked to each other while preventing wobbling and inclining due to the external forces in the rotating direction and the vertical direction.

In the second embodiment, the inner wall surface 521 of the annular rib 52 is formed with the depressed grooves 52P, 52Q, 52R, and 52S that contact with the wall surfaces of the press-fit ribs 34 excepting the press-fit portions 341. The upper end 301 is formed with the support seats 39A and 39B respectively in the positions adjacent to the locking arms 38A and 38B to support the lower end of the valve main body 1. Further, the inner peripheral surfaces of the locking pawls 382A and 382B are shaped to hold or surround the outer peripheral surface of the valve main body 1. In addition to the above advantages, therefore, the locking pawls 382A and 382B can restrict movement of the outer peripheral surface of the valve main body 1 in the substantially horizontal direction. This can further prevent the valve main body 1 and the mounting plate 3 in the locked state from wobbling and inclining due to the external forces applied in the rotating direction and the vertical direction.

According to the second embodiment, therefore, the valve main body 1 and the mounting plate 3 can be easily and reliably locked to each other while further preventing wobbling and inclining due to the external forces in the rotating direction and the vertical direction.

The present invention is not limited to the above embodiments and may be embodied in other specific forms without departing from the essential characteristics thereof.

(1) In the first embodiment, the locking arms 31A and 31B are provided standing at an angle on the upper end of the mounting plate 3 so that respective distal ends are close to the valve main body side. Alternatively, the locking arms 31A and 31B may be provided to stand vertically. This is because the locking arms 31A and 31B are less likely to warp in the opening direction due to the repulsion force acting from the press-fit portions 341.

(2) In the first embodiment, the protrusions 55A and 55B and the locking pawls 312A and 312B have horizontal surfaces which abut on each other for engagement. In the second embodiment, the abutting surfaces 382A5 and 382B5 of the locking pawls 382A and 382B contacting with the protrusions 55A and 55B are horizontal surfaces. Alternatively, those abutting surfaces may be provided with returned portion. This returned portion of each abutting surface can prevent warping of the locking arms 31A, 31B, 38A, and 3813, so that the locked state can be more easily maintained.

Industrial Applicability

The present invention can be utilized particularly as a chemical liquid control valve to be used in a cleaning process of a semiconductor manufacturing device.

REFERENCE SINGS LIST

1 Valve main body
2 Valve upper part
3 Mounting plate
4 Valve element, Diaphragm valve element
11 Inlet port
12 Outlet port
13 Inflow passage
14 Outflow passage
15 Valve chamber
15 Inner wall
16 Outer wall
17 Boss portion
18A, 18B Side surface of valve main body
31 Locking arm
34 press-fit rib
36 Support rib
38 Locking arm
39 Support seat
52 Annular rib
55 Locking protrusion
100 fluid control valve, Chemical control valve
1011 fluid control valve, Chemical control valve
312 Locking Pawl
341 Press-fit portion
342 Curved portion
382 Locking pawl

What is claimed is:

1. A fluid control valve comprising:
a valve main body including an inlet port and an outlet port each formed opposite side surfaces; and
a mounting plate attached to a lower surface of the valve main body, wherein
the vale main body is provided with locking protrusions in side surfaces perpendicular to the opposite side surfaces,
the mounting plate is formed with locking arms each standing on an upper surface of the mounting plate, the locking arms each having a locking pawl facing and engaging with the locking protrusions,
the valve main body is formed with a first rib spaced from a central axis on the lower surface of the valve main body,
the mounting plat is formed with a second rib standing on the upper surface of the mounting plate and including a press-fit portion press-fitted against a wall surface of the first rib,
the second rib has a first wall surface and a second wall surface, the wall surface and the second wall surface facing opposite directions,
the press-fit portion is formed only on the first wall surface of the second rib and is spaced from the central axis of the valve main body, and
the mounting plate includes protruding support ribs that support the lower surface of the valve main body on an inlet port side and an outlet port side, the support ribs being located at an outer circumferential side of the first rib.

2. The fluid control valve according to claim 1, wherein the wall surface of the first rib is formed with a depressed groove that contacts with the first wall surface of the second rib, except for the press-fit portion of the first wall surface.

3. The fluid control valve according to claim 2, wherein the mounting plate is formed with support seats on the upper surface in adjacent positions to the locking arms to support the lower surface of the valve main body.

4. The fluid control valve according to claim 3, wherein each of the locking pawls has an inner peripheral surface shaped to hold an outer peripheral surface of the valve main body.

5. The fluid control valve according to claim 1, wherein the second rib includes a plurality of press-fit ribs arranged symmetrically about the central axis.

6. The fluid control valve according to claim 1, wherein the press-fit portion is formed at a predetermined height from a base of the second rib.

7. The fluid control valve according to claim 1, wherein the second rib includes a curved portion along the wall surface of the first rib, and the press-fit portion is provided in the curved portion.

8. The fluid control valve according to claim 1, wherein the mounting plate is formed with support seats on the upper surface in adjacent positions to the locking arms to support the lower surface of the valve main body.

9. The fluid control valve according to claim 1, wherein each of the locking pawls has an inner peripheral surface shaped to hold an outer peripheral surface of the valve main body.

* * * * *